Aug. 26, 1952     E. H. PAULSEN     2,608,098

SAMPLING APPARATUS

Filed May 24, 1947

INVENTOR.
EDWARD H. PAULSEN
BY
HIS ATTORNEYS.

Patented Aug. 26, 1952

2,608,098

UNITED STATES PATENT OFFICE 2,608,098

SAMPLING APPARATUS

Edward H. Paulsen, White Plains, N. Y.

Application May 24, 1947, Serial No. 750,289

3 Claims. (Cl. 73—422)

This invention relates to improvements in sampling devices or apparatuses and it relates particularly to an improved type of sampling device having a restricted orifice therein adapted to be used in devices for taking proportional samples of liquids or for feeding liquids in predetermined proportions.

In certain prior types of liquid sampling devices, such as, for example, the devices disclosed in my co-pending application Serial No. 552,450, filed September 2, 1944, it has been found desirable in many instances to position the sample-receiving receptacle below the level of the conduit through which the liquid being sampled is flowing. In my prior sample-taking and liquid-feeding devices, the structure of the device is such that equal pressures are maintained at all times on the corresponding sides of orifices in the main flow conduit and in the sample-taking conduit.

No difficulty is encountered in taking proportional samples or feeding liquids proportionally with this type of device so long as the sample receiver is above the level of the main flow conduit. However, when the sample receptacle is below the flow conduit, liquid tends to leak through the orifice in the sample-taking conduit slightly in excess of the amount that would normally pass through the orifice despite the fact that the pressures on the opposite sides of the orifice are the same. This leakage renders the sample inaccurate and becomes particularly objectionable when flow stops in the main flow conduit.

I attempted to overcome this disadvantage by installing a trap in the sample conduit on the downstream side of the orifice, and also to overcome leakage by installing the orifice plate in a horizontal position and with the liquid discharging upwardly through the orifice. However, these expedients were not very satisfactory because it was important to have self-draining piping or conduit between the downstream side of the orifice and the sample receiver in the interests of accuracy and sanitation.

I have now overcome the disadvantage of my prior device by including in the device a novel type of orifice plate which permits the conduit connecting the sample receiver to the flow conduit to be self-draining below the orifice and at the same time preventing leakage when flow is discontinued through the main flow conduit, regardless of the location of the sample receiver.

Essentially, the novel feature of my new sampling device resides in providing an orifice plate having the orifice formed in an inclined part of the orifice plate so that the highest edge of the orifice at its upstream side is below the lowest edge of the orifice on the downstream side of the orifice. Under these conditions, with the pressures on opposite sides of the orifice equal, no leakage will take place through the orifice, but the orifice will be filled almost to the lower edge of the downstream side of the orifice and, therefore, in a condition to discharge liquid immediately when the pressure on the downstream side of the surface becomes less than the pressure on its upstream side.

For a better understanding of the present invention, reference may be had to the accompanying drawings, in which.

Figure 1:
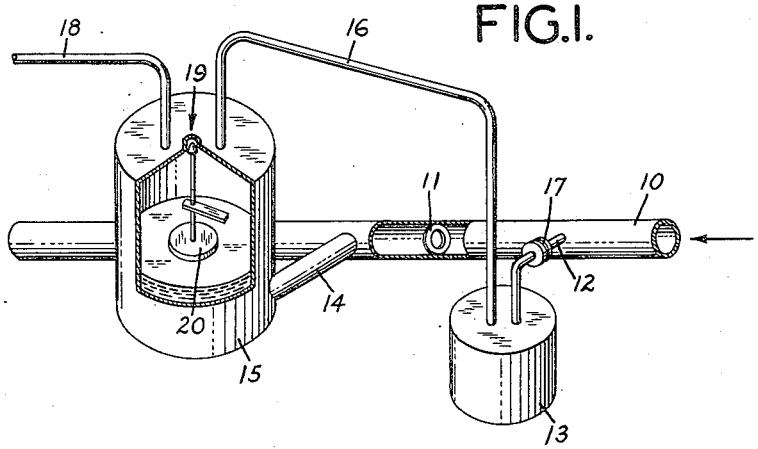
Figure 1 is a perspective view of a typical form of sample-taking device embodying the present invention and including the new orifice plate.

The sample-taking device illustrated in Figure 1 of the drawings is generally similar to the sampling device disclosed in my co-pending application Serial No. 552,450, and includes a main flow conduit 10 having a conventional orifice plate 11 mounted therein. On the upstream side of the orifice plate 11 is a sample-taking conduit 12 which is connected to a sample receiver 13 disposed below the level of the conduit 10.

On the downstream side of the orifice plate 11 and connected to the conduit 10 by a conduit 14 is an air pressure chamber 15. The air pressure chamber 15 is connected by means of a conduit 16 to the sample receiver 13 in order that the pressures on opposite sides of the orifice plate 11 and an orifice plate member 17 mounted in the conduit 12 will be equalized. Also, in order to assure accurate sampling, it is essential that a liquid level or pressure be maintained in the air chamber 15 which is equal to the liquid pressure at the center of the orifice plate 17 so that the pressures on the downstream sides of the orifice plates 11 and 17 will be equal under all conditions. The pressures on the upstream sides of the orifice plates 11 and 17 will be equal, of course, under all conditions.

In order to maintain the desired hydrostatic head in the chamber 15, air under pressure is introduced continuously into the chamber by means of a conduit 18 and discharged from the chamber 15, when the pressure becomes too high, through a valve 19 which may be controlled by means of a float 20 in the chamber 15. Thus, when the air pressure in the chamber 15 becomes sufficient to tend to force the liquid in the chamber 15 below a predetermined level, the valve 19 opens farther, permitting air to escape from the chamber 15 and retaining the liquid at the desired level. When the liquid level in the chamber 15 tends to become too high, the valve 19 closes and air pressure displaces the liquid to the proper level in the chamber 15. Under most conditions, except when large pressure surges in the liquid occur, the level of the liquid in the chamber will not vary at all.

Figure 2:
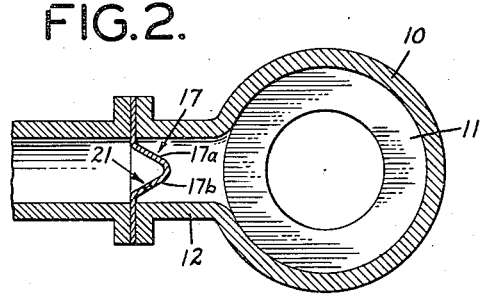
Figure 2 is a view in section taken through the main flow conduit, a portion of the sample-taking conduit and the orifice plate therein.
Figure 3:
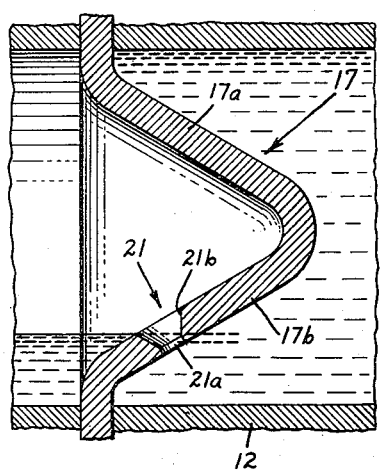
Figure 3 is an enlarged view in section disclosing details of construction of the orifice plate used in the sampling device.

As pointed out above, a conventional orifice plate, that is, a flat orifice plate having a hole therethrough, does not function satisfactorily in a sampling device of the type described above for the reason that liquid tends to leak through the orifice in excess of the amount determined by the proportions of the orifices despite the equal pressure conditions on opposite sides of the aperture. To overcome this disadvantage, I have provided an orifice plate 17 of novel form which prevents the unwanted leakage without altering the accuracy of the sample taken by the system. As shown in Figures 2 and 3, the orifice plate may be generally circular, but its mid-portion is bent or otherwise formed to provide a pocket or a recess having an upper inclined wall 17a and a lower inclined wall 17b. These walls are formed in generally V or angular relation although the actual shape of the recess is not very important so long as the lower wall 17b has a portion inclined at an acute angle to the axis of the plate 17.

The orifice 21 is formed in the lower inclined portion 17b of the plate 17 and may consist of a generally circular opening 21a extending part way through the plate 17b and having a flaring discharge end 21b. The important feature of the orifice plate is the arrangement of the orifice 21 in the inclined portion 17b so that the highest edge of the upstream end of the orifice 21 is below the lowest edge of the downstream end of the orifice.

With this arrangement, the air pressure acts downwardly on the liquid at the downstream end of the orifice 21 and maintains the level of the liquid in the orifice below the lowest edge of the downstream side of the orifice. Therefore, liquid cannot leak through the orifice so long as the pressure at the downstream end is at least equal to the pressure at the upstream end. In other words, downward air pressure of a magnitude substantially equal to the hydrostatic head at the upstream side of the orifice is sufficient to prevent any change in the level of the liquid in the orifice 21, and, as a consequence, there can be no overflow through this orifice unless the pressure on the upstream side of the orifice becomes greater than the air pressure on the downstream side of the orifice.

The orifice plate of the type described has proved to be completely successful in preventing leakage in a sample-taking device of the character described above, when the flow of liquid has ceased in the main flow conduit 10. Moreover, the inclination of the portion 17b is sufficient to assure that any liquid flowing through the orifice 21 will drain into the sample receiver, and not collect on the orifice plate.

It will be understood, of course, that the shape of the orifice can be modified substantially. For example, the orifice 21 may be elongated or oblong transversely of the plate 17, and it may take other shapes that may be required so long as the lowest portion of the downstream side of the orifice is above the highest portion of the upstream side of the orifice. Moreover, the orifice plate is not restricted to use in sampling or feeding systems, but it can be used in substantially any place that orifice plates have been used before. Therefore, the form of the invention described herein should be considered as illustrative of the invention and not as limiting the scope of the following claims.

I claim:

1. A liquid sampling device having a flow conduit provided with a restricted orifice therein, a liquid receiving chamber connected to said flow conduit to one side of said orifice, a pressure equalizing chamber connected to said conduit at the opposite side of said orifice from said liquid-receiving chamber to receive liquid from said conduit and a connection between said chambers to transmit gas pressure from one chamber to the other to maintain equal gas pressures therein; a second orifice plate positioned between said flow conduit and said receiving chamber; a portion of said plate being inclined at an acute angle to said plate and to the horizontal and having upper and lower surfaces, and a single orifice extending through said inclined portion, said orifice being so located that the highest point of the orifice at said lower surface of said inclined portion is lower than the lowest point of said orifice at said upper surface when said plate is substantially vertical, said plate being otherwise imperforate.

2. A liquid sampling device having a flow conduit provided with a restricted orifice therein, a liquid receiving chamber connected to said flow conduit to one side of said orifice, a pressure equalizing chamber connected to said conduit at the opposite side of said orifice from said liquid-receiving chamber to receive liquid from said conduit and a connection between said chambers to transmit gas pressure from one chamber to the other to maintain equal gas pressures therein; a second orifice plate positioned between said flow conduit and said receiving chamber, said plate member being substantially disc-shaped and having its mid-portion displaced laterally to provide a portion inclined at an acute angle to the axis of said member and to the horizontal and a single orifice extending through said inclined portion for flow of a stream of liquid therethrough, said orifice having the lowest point of its downstream end higher than the highest point of its upstream end, said plate being otherwise imperforate.

3. A liquid sampling device having a flow conduit provided with a restricted orifice therein, a liquid receiving chamber connected to said flow conduit to one side of said orifice, a pressure equalizing chamber connected to said conduit at the opposite side of said orifice from said liquid-receiving chamber to receive liquid from said conduit and a connection between said chambers to transmit gas pressure from one chamber to the other to maintain equal gas pressures therein; a second orifice plate positioned between said flow conduit and said receiving chamber and disposed in the path of a stream of liquid and having its mid-portion displaced outwardly from one side in a direction upstream of said stream of liquid to form a pocket facing downstream having a portion inclined at an acute angle to the plate member and to the horizontal, a single orifice extending through said inclined portion and having one end opening downstream into said pocket and the other end opening upstream to the outside of said displaced portion, said orifice being of such dimensions and inclination that the lowest point of said downstream end is higher than the highest point of said upstream end.

EDWARD H. PAULSEN.

REFERENCES CITED

The following references are of record in the file of this patent:

UNITED STATES PATENTS

| Number | Name | Date |
|---|---|---|
| 2,127,501 | Dall | Aug. 23, 1938 |
| 2,138,998 | Brosius | Dec. 6, 1938 |

FOREIGN PATENTS

| Number | Country | Date |
|---|---|---|
| 199,135 | Switzerland | Oct. 17, 1938 |
| 497,821 | France | of 1919 |